United States Patent
Toncelli

[11] Patent Number: 5,928,585
[45] Date of Patent: Jul. 27, 1999

[54] METHOD FOR THE PRODUCTION OF SLABS OF GRANULATED STONE MATERIALS AND/OR SANDS BOUND WITH A HARDENABLE RESIN

[76] Inventor: Marcello Toncelli, Via Papa Giovanni XXIII, 2 36061 Bassano del Grappa (Vicenzza), Italy

[21] Appl. No.: 08/788,406

[22] Filed: Jan. 27, 1997

[30] Foreign Application Priority Data

Jan. 29, 1996 [IT] Italy ................................ TV96A0007

[51] Int. Cl.⁶ ............................... B28B 1/08; B28B 7/36; B29C 33/42
[52] U.S. Cl. ............................ 264/71; 264/102; 264/337; 264/338
[58] Field of Search ............................ 264/71, 70, 101, 264/102, 337, 338

[56] References Cited

U.S. PATENT DOCUMENTS

| | | |
|---|---|---|
| 1,702,896 | 2/1929 | Frederick . |
| 3,644,611 | 2/1972 | Wiles . |
| 4,031,176 | 6/1977 | Molbert . |
| 4,266,921 | 5/1981 | Murray . |
| 4,466,937 | 8/1984 | Johnston et al. . |
| 4,877,656 | 10/1989 | Baskin . |
| 4,970,044 | 11/1990 | Kim et al. . |
| 5,156,791 | 10/1992 | Sano et al. . |

FOREIGN PATENT DOCUMENTS

| | | |
|---|---|---|
| 462224 | 6/1975 | Australia . |
| 0 335 097 | 10/1989 | European Pat. Off. . |
| 0 427 651 | 5/1991 | European Pat. Off. . |
| 0 449 584 | 10/1991 | European Pat. Off. . |
| 1021972 | 2/1953 | France . |
| 2096997 | 3/1972 | France . |
| 2387749 | 11/1978 | France . |
| 2437277 | 4/1980 | France . |
| 885 153 | 8/1953 | Germany . |
| 2 060 747 | 6/1972 | Germany . |
| 1 326 006 | 8/1973 | Germany . |
| 371035 | 9/1963 | Switzerland . |
| 722754 | 1/1955 | United Kingdom . |
| 1294314 | 10/1972 | United Kingdom . |
| WO 92/10349 | 6/1992 | WIPO . |
| WO 92/18327 | 10/1992 | WIPO . |

OTHER PUBLICATIONS

Plastiques modernes et elastomeres, vol. 20, Apr. 1968, pp. 68–70 XP002017502 "L'utilisation du film de polyfluorure de vinyle comme agent de demoulage" A. Yazgi.

Primary Examiner—Karen Aftergut
Attorney, Agent, or Firm—McAulay Nissen Goldberg Kiel & Hand, LLP

[57] ABSTRACT

A method for manufacturing of slabs of granulated stone material and/or sands bound with a resin which can be hardened, and preferably hot with the aid of a catalyst. The mixture of granulated material and/or sand and resin is deposited as a layer of uniform thickness and a predetermined outline onto a support protected by a first sheet of material, and the upper surface of the layer and its sides between the lower surface and its upper surface, is also protected with a similar second sheet of material. Then, the protected layer is subjected to vibratory compaction under vacuum and to a hot hardening process in the presence of the catalyst. The two protective sheets are made of resilient material, particularly of natural or synthetic rubber, such as neoprene, and after hardening of the sheets, the sheets are removed, by pulling them from the covered and protected surfaces of the resulting slab.

9 Claims, 1 Drawing Sheet

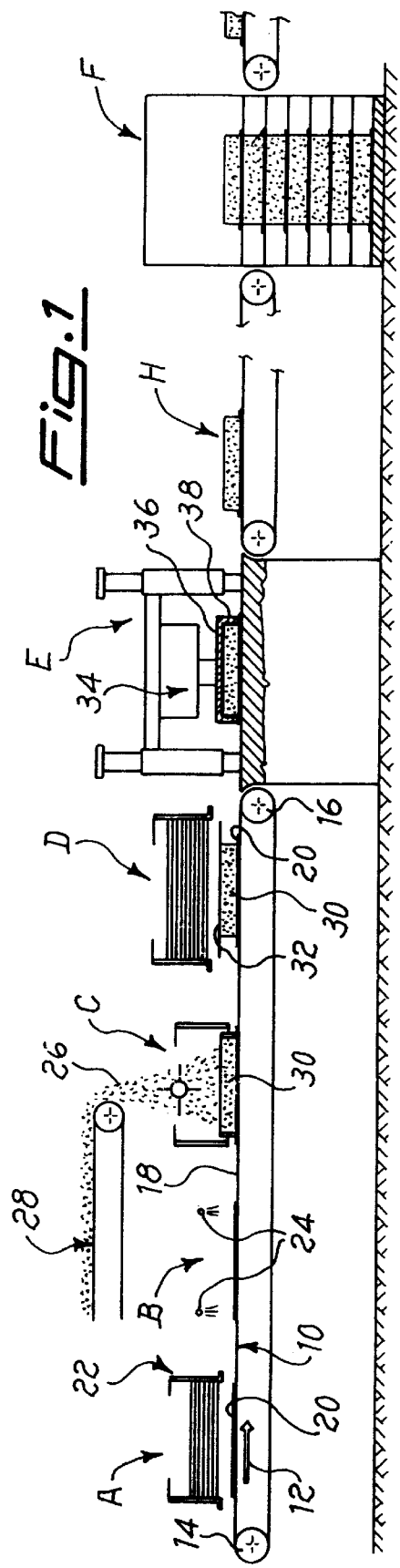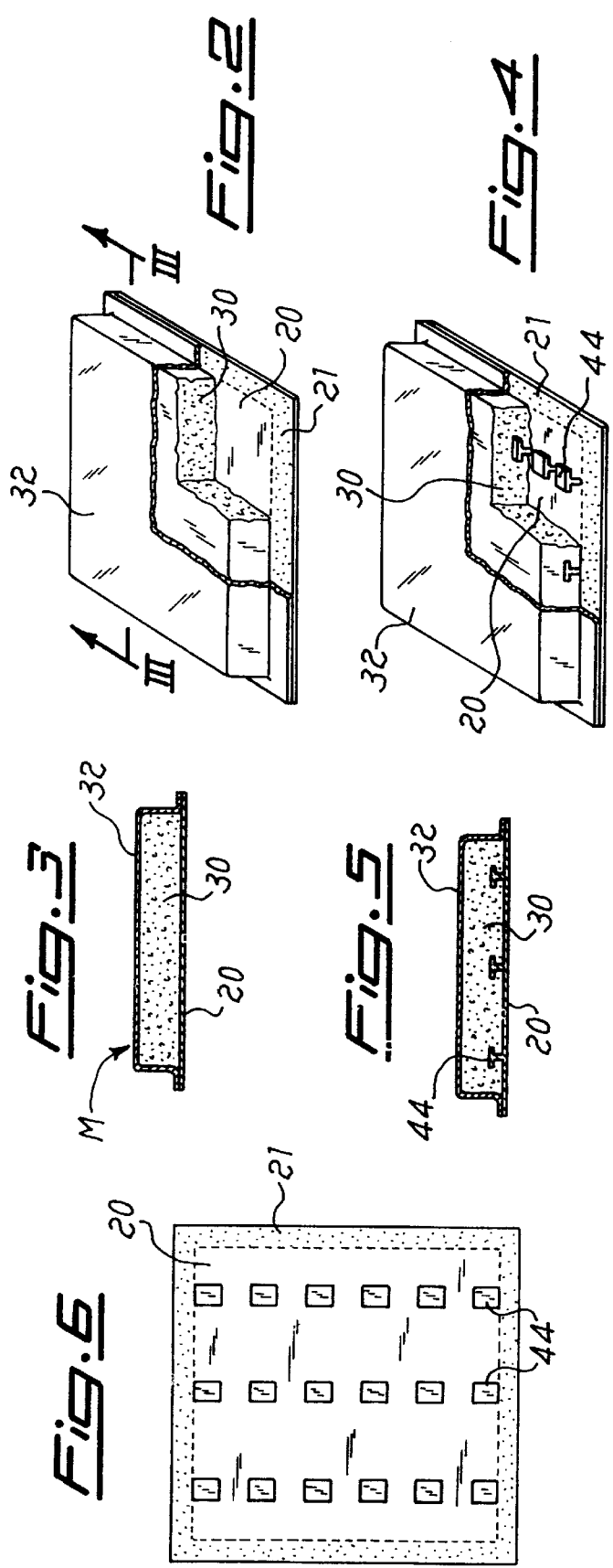

METHOD FOR THE PRODUCTION OF SLABS OF GRANULATED STONE MATERIALS AND/OR SANDS BOUND WITH A HARDENABLE RESIN

The present invention relates to the manufacture of slabs of crushed stone materials and sands bound with resin.

More specifically, the present invention relates to a method and apparatus for the manufacture of the aforementioned slabs.

It is known in the prior art to manufacture slabs made of granulated natural stone materials and/or sands and of a binder consisting of a resin which is hardened, preferably hot, in the presence of a catalyst.

In this connection, Italian patents Nos. 1,056,388 and 1,117,346 (U.S. Pat. No. 4,204,820) are worth noting and describe a method which provides essentially for the following steps:

1. preparation of a mixture constituted by granulated material of a selected size and by synthetic resin;
2. spreading of metered quantities of mixture at regular intervals on a conveyor belt, the surface of which is covered by a protective strip of paper, so as to arrange the mixture in a substantially uniform thickness within a predetermined perimeter;
3. superimposition of a second protective paper strip on the layer of mixture and advancing to a pressing step under a press plate, with simultaneous application of a vibration of predetermined frequency, the mixture at the same time being kept under a vacuum of predetermined magnitude;
4. transfer of the unfinished slab to a hardening oven in which the resin hardens and the slab acquires the final properties desired.

The apparatus for implementing the method described briefly above consists essentially of a conveyor belt which advances intermittently from the mixture-spreading station to the press for vibratory compaction under vacuum and from there to the drying and hardening oven.

A problem connected with this method, to which an industrially advantageous solution has not up to now been found, is that of the removal of the paper which, owing to the anchorage exerted by the resin, remains strongly adhering to the front and rear face of each resulting slab.

Moreover, in many cases, the application of heat in the resin-hardening step produces, in the paper covering the slabs, a corrugated shape which is mirrored in the adjacent surface of the slab. The removal of this paper involves lengthy and expensive operations, for example of sizing with abrasive tools constituted by diamond-impregnated segments or plates and thus also the removal and consequent wastage of a surface layer of the slab, the thickness of which increases as the corrugated shape and the wrinkles of the paper becomes more evident.

Clearly, the production of the finished slabs is thus quite laborious and hence quite expensive. The main object of the present invention is to provide a method and apparatus for the production of slabs of granulated stone materials and/or sands bound with resin in which the problem set out briefly above is substantially solved in an industrially advantageous manner.

This object is achieved, in the first place, by means of a method for the manufacture of slabs constituted by granulated stone materials and/or sands bound with a hardenable resin, of the type in which a mixture of granulated stone materials and/or sands and hardenable resin is spread on a support so as to form a layer of substantially uniform thickness, the support being protected by a sheet material interposed between the upper surface of the support and the layer of mixture, the support is transferred to a station for vibratory compaction under vacuum, care being taken to protect the upper surface of the layer of mixture with a sheet material superimposed on the layer before it reaches the station and, after the vibratory compaction under vacuum, the support with the layer of compacted mixture is transferred to a hardening station, the method being characterized in that the sheet material, that is, both the sheet interposed between the support and the layer of mixture and the sheet extended to protect the upper surface of the mixture, is constituted by a highly resilient material.

In the preferred embodiment of the present invention, the sheet material is constituted by natural or synthetic rubber particularly butadiene, neoprene, silicone rubbers, natural rubber or another material having similar necessary properties of resilience and resistance to chemical agents and heat, taking it into account that the resin hardening step involves temperatures of between 130 and 150° C.

Reference will be made to neoprene in the following description without limiting intention, but solely to indicate the preferred material, by way of example.

It has in fact been found that, if thin sheets of neoprene, preferably at 3 mm, are substituted for the sheet of paper, these not only adhere perfectly during the pressing of the surface of the tile or slab being formed, permitting the production of perfectly planar surfaces and of sufficiently and satisfactorily sharp corners but, in particular, can be removed from the slab after hardening simply by the application of a force directed in a direction such as to separate the sheets from the corresponding faces of the completed slab.

The lower neoprene sheet (that is, that on which the slab bears during the hardening stage) is preferably associated with a substantially inextensible cloth, which is preferably incorporated in its thickness and has the function of preventing the extension of the rubber during the transfer of the slab by the transfer means of the moulding to the catalysis oven (and hence with the slab still interposed between them) from damaging the surface of the slab. The transfer is normally carried out by a pliers truck gripping the neoprene lower sheet and dragging the whole into the catalysis oven.

Moreover, the separation of the sheets from the completed slab does not involve tearing or damage of the sheets and they can therefore be re-used many times, clearly with economic advantages.

According to a variant of the invention, a release agent and/or lubricant of known type is applied to the surface of the neoprene sheet which is intended to come into contact with the mixture.

The opportunities afforded by the present invention also include the provision, on the neoprene sheet, on its surface which is intended to come into contact with the mixture, of shaped projections and/or recesses which necessarily cause the formation of corresponding recesses or projections in the corresponding facing surface of the finished slab. For example, if the surface in question is the rear face of the slab, these recesses or projections favour the anchorage of the slab to the surface on which they are laid. In the case of the front or visible face of the finished slab, on the other hand, certain patterns or decorative designs can thus be formed.

Moreover, the use of the sheet of natural or synthetic rubbery material simplifies the hardening of the slab, particularly when it takes place by the application of heat assisted by catalytic action. In fact, in embodiments of the prior art, the necessary heat was applied by the interposition of each slab to be hardened between two metal plates brought close together and heated to a suitable temperature. This was due, in particular, to the need to ensure a homogeneous and uniform transfer of heat to the entire slab being hardened.

With the use of the rubbery sheet material, it becomes possible to carry out this step in a more controlled manner since the rubbery sheet, which adheres well to the heating plate and to the surface of the material to be hardened, permits more homogeneous and gradual heating of the slab to be hardened, owing to its different heat-transfer coefficient in comparison with that of the metal plate.

In addition, the presence of the neoprene sheet permits a notable increase in the catalysis temperature since it prevents any adverse effects such as, for example, the formation of carbon dioxide (in gaseous form and hence in the form of bubbles) in the binding resin.

The apparatus according to the present invention in turn includes a support which can be moved through a plurality of stations, there being provided:

a first station for the deposition of a protective sheet on the support, a second station for the spreading of a previously-prepared mixture of granulated stone material and/or sand and hardenable resin in the form of a layer of predetermined thickness and outline on top of the sheet of protective material, a third station for the application of a second sheet of protective material on top of the layer of mixture deposited and spread on the first sheet of protective material, a fourth station for vibratory compaction under vacuum, in which a mechanical press connected to, means for generating vibratory motion at a predetermined frequency acts on top of the second sheet, the vibratory compaction being carried out with the layer of mixture kept under a predetermined degree of vacuum, and a fifth station for the hardening of the resin forming the mixture, the hardening station being constituted by an oven in which each slab preformed with the use of the mixture and emerging from the station for vibratory compaction under vacuum is subjected to the effect of heat, normally with the aid of a suitable catalyst, for the time necessary to complete the hardening, characterized in that the protective sheet material is highly resilient material, consisting of natural or synthetic rubber, preferably selected from butadiene, neoprene, silicone rubbers, natural rubber or another material rubber, the first and second sheets of resilient material having dimensions larger than those of the layer of mixture so that the edges of the two sheets are superimposed for a predetermined width outside the layer of mixture, enclosing it along its entire perimeter.

A suitable release agent and/or lubricant may also be possibly applied to the surfaces of the sheets which are intended to come into contact with the mixture.

In the preferred embodiment of the present invention, downstream of the hardening station, a station is provided in which the protective sheets of resilient material are removed, for example, by pulling-off, the sheets then being recycled upstream for re-use, naturally after they have been cleaned of any residues of mixture.

The characteristics and advantages of the present invention will become clear from the following description of a preferred embodiment, given with reference to the appended drawings, in which:

FIG. 1 is a schematic side view of the apparatus according to the present invention, FIG. 2 is a partially-sectioned, perspective view of a product made of a mixture of granulated material and resin after vibratory compaction under vacuum and before the drying and hardening step, FIG. 3 is a transverse section taken in the plane III–III of FIG. 2, FIGS. 4 and 5 are views similar to FIGS. 2 and 3 of a variant of the present invention, FIG. 6 is a plan view of the lower sheet of resilient material used in the manufacture of the product of FIG. 4.

With reference first of all to FIGS. 1, 2 and 3, the apparatus according to the present invention comprises a support 10 in the form of an endless conveyor belt driven in the direction indicated by the arrow 12. Rollers 14 and 16, driven by drive means, not shown, are provided for the intermittent translational movement of the conveyor belt 10.

In a first station A, suitable means supply neoprene sheets 20 taken from a feeder 22 onto the upper surface or pass 18 of the belt 10, one at a time.

In accordance with an embodiment of the apparatus and of the method of the present invention, immediately downstream of the station A there is a station B in which suitable spray nozzles 24 deposit on the sheet 20 a release composition having the function of preventing a thin layer of granulated material and resin mixture from adhering on it.

Any release agent may be used, such as, for example, the releasing compositions which are applied to the backs of self-adhesive tapes so that the tapes can be wound in rolls and unwound in the usual manner.

Naturally, instead of the releasing composition, other means having the same function, such as, for example, of anti-adhesive thin films, may be used.

Immediately downstream, the sheet 20 transported by the conveyor belt 10 enters a station C in which a metered quantity of previously prepared mixture 26 of granulated stone material and/or sand and hardenable resin binder is deposited, with the aid of a suitable moulding frame, on the upper surface of the sheet 20 in the form of a layer 30 of uniform thickness having substantially the desired dimensions of the final slab.

In the drawing, a feeder in the form of a conveyor belt 28 is shown for supplying the previously mixed mixture.

Naturally, in this case also, a different feeder may be provided instead of the conveyor belt 28, or the output of the mixer preparing the mixture 26 may used directly.

From the station C the conveyor belt and then the sheet 20 bearing the layer 30 of mixture, is transferred to a further station D to which a second sheet (the upper sheet) 32 of the same resilient material, previously sprayed with a release agent which is deposited on top of the layer 30 so that its edges fit together with those of the lower sheet 20. Since the layer 30 is thus encapsulated between the two sheets 20 and 32, the dimensions of the sheet 32 clearly have to be larger than those of the sheet 20 in order to achieve the aforementioned fitted-together condition of the edges of the sheets 20 and 32.

To achieve this condition, peripheral pressing means may be provided in the station D, or the aforementioned condition may be achieved within the next station E.

This is of a type known, for example, from the two Italian patents cited above and consists of a press 34 having a compaction and pressure plate 36 which in turn is movable between a raised or inactive position in which it permits the input and discharge of the product constituted by the mixture 30 imprisoned between the two sheets 20 and 32, and a lowered or operative position in which it performs the aforesaid compaction (which is the condition shown in FIG. 1). In this situation, moreover, a pressing frame 38 is fixed to the plate 36 and presses together the four peripheral edges of the two sheets 20 and 32 which fit together, preventing the mixture forming the layer 30 from escaping.

Moreover, the thickness of the upper sheet 32 is selected so as to be thin enough (about 3 mm) to produce sharp upper corners in the product resulting from the compaction carried out by the plate 36.

As is known, a vibration generator (not shown) operating at a predetermined frequency is fixed to the plate 36 of the press and the assembly constituted by the press and the vibrator as well as by the layer of mixture imprisoned between the two sheets 20 and 32 is in turn enclosed in a chamber or housing (also not shown) in which a vacuum of predetermined magnitude is formed at least during the vibratory compaction stage.

At the output of the station E, the product M resulting from the vibratory compaction under vacuum is in the condition shown in FIG. 3 and is transferred to a station F consisting of an oven 40 for hardening or cross-linking the binding resin, this oven possibly being the oven with metal plates 42 already mentioned above or a pressure oven, which is also known. At the output of the station F, each product is sent to a finishing step (that is, to the conventional processes carried out on slabs of stone material) care first being taken to remove the sheets of resilient material 20 and 32.

As already mentioned, this removal takes place very easily by the application of a force which tends to separate each sheet from the adjacent surface of the slab of crushed stone bound with polymerized resin.

A substantially inextensible cloth is preferably fixed to the lower sheet, or even more preferably, is incorporated in its thickness, so that when this sheet is pulled off together with the upper sheet in a condition in which the weight of the slab not yet hardened bears on the lower sheet, the slab is not damaged by the resilient extension of the sheet.

Moreover, the sheets 20 and 32 are recovered intact so that they are recovered and recycled upstream of the stations A and D, respectively, after short and easy operations to clean off any debris of the mixture remaining adhering to the surfaces of the sheets.

Alternatively, one of two sheets of resilient material may be provided with shaped projections or recesses, for example, projections of the type generally indicated 44 in FIG. 6, which may also have shapes with undercuts since the resilience of the material enables them to be separated from the final product by virtue of their resilient deformability.

With regard to the rear face, that is, the face which is not in view in the finished slab, it is thus possible, for example, to form a honeycomb structure which may even have very small cells.

With regard to the front face, on the other hand, that is, the face of the final slab which is in view, it is thus possible to form decorative patterns either in relief or in recessed or incised form, with the use of corresponding recesses or projections formed in the face of the sheet of resilient material which is contact with the mixture.

Recesses or projections are thus formed in the surfaces of the final slab and, as already mentioned, when the surface of the slab in which they are formed is the rear face, that is, the face which is not in view, serve to improve the anchorage of the final slab to the wall or floor to which the slab is subsequently fixed, for example, by means of a cementitious mortar.

Alternatively, in the case of the front face of the finished slab, decorative patterns can be formed in recessed form or in relief respectively.

Naturally, linear reinforcing elements may also be associated with these recesses or grooves, or they may be used to combine, with the rear face, a second layer of another material such as, for example, a sound-deadening and/or uninflammable material.

Naturally, conceptually equivalent modifications and variants are possible and foreseeable, both with regard to the method and with regard to the apparatus, without departing from the scope of the invention.

I claim:

1. A method of producing self supporting slabs having a thickness of at least 10 mm made of granulated stone materials and/or sands bound with a hardenable resin, in which a mixture of granulated stone material and/or sand and hardenable resin is spread onto a support so as to form a layer of a substantially uniform thickness, the support being protected by a sheet material interposed between an upper surface of the support and a layer of the mixture, the support being transferred to a station for vibratory compaction under vacuum, care being taken to protect an upper surface of the layer of mixture with a sheet material superimposed onto the layer before it reaches the station and, after the vibratory compaction under vacuum, the support with the layer of compacted mixture being transferred to a hardening station, the method comprising providing a sheet material constituted by natural or synthetic rubber having properties of resilience and resistance to chemical agents and heat selected from the group consisting of butadiene, neoprene, silicone rubber, and natural rubber and the sheet material comprising a lower sheet interposed between the support and a layer of starting mixture being deposited thereonto and of an upper sheet being spread out to protect an upper surface of the mixture, the sheets having greater dimensions than the layer of starting mixture so that faces of peripheral strips of the upper and lower sheets are in reciprocal contact when the upper sheet is placed onto the upper surface of the layer of starting mixture and the peripheral strips protrude from perimetrical boundaries of the layer of starting mixture positioned therebetween so that the faces and perimetrical edges of the peripheral strips are brought into contact with each other and each side of the layer of starting mixture for fully enclosing the layer of starting mixture within the upper and lower sheets, and applying a layer of a release agent to a face of one peripheral strip of at least one of the two sheets of resilient material, on the face which fits together with the face of the peripheral strip of the other sheet of resilient material.

2. The method according to claim 1, wherein the sheet material is resistant to temperatures of between 130 and 150° C.

3. The method according to claim 1, including the step of applying a release composition and/or lubricant to a surface of each sheet, which is intended to come into contact with the layer of starting mixture.

4. The method according to claim 1, including projections and/or recesses on a surface of at least one of the sheets which is intended to come into contact with the layer of starting mixture, the projections and/or recesses forming corresponding recesses and/or projections in the corresponding face of a finished slab.

5. The method according to claim 4, wherein the projections and/or recesses are shaped so as to form recesses and/or projections, respectively, for improving anchorage of the slab in cementitious mortar used for laying the slab.

6. The method according to claim 4, wherein the projections and/or recesses are shaped so as to form recesses and/or projections, respectively, with an aesthetic and decorative effect.

7. The method according to claim 1, wherein the release agent is a releasing composition used for backs of self-adhesive tapes.

8. The method according to claim 1, including associating a substantially inextensible cloth with the lower sheet.

9. The method according to claim 8, including incorporating the cloth in a thickness of the lower sheet.

* * * * *